US012429019B2

(12) United States Patent
Doi et al.

(10) Patent No.: US 12,429,019 B2
(45) Date of Patent: *Sep. 30, 2025

(54) FUEL AND AIR CHARGE FORMING DEVICE

(71) Applicant: Walbro LLC, Cass City, MI (US)

(72) Inventors: Kazuki Doi, Shibata-gun (JP); Naoya Kumagai, Iwanuma (JP); Dairoku Suzuki, Watari-Gun (JP); Jun Takano, Shibata-Gun (JP)

(73) Assignee: WALBRO LLC, Cass City, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/373,380

(22) Filed: Sep. 27, 2023

(65) Prior Publication Data

US 2024/0018927 A1 Jan. 18, 2024

Related U.S. Application Data

(63) Continuation of application No. 17/869,587, filed on Jul. 20, 2022, now Pat. No. 11,802,529.

(60) Provisional application No. 63/224,064, filed on Jul. 21, 2021.

(51) Int. Cl.
*F02M 61/14* (2006.01)
*F02M 61/18* (2006.01)

(52) U.S. Cl.
CPC ............ *F02M 61/14* (2013.01); *F02M 61/18* (2013.01)

(58) Field of Classification Search
CPC ...... F02M 61/14; F02M 61/18; F02M 69/044; F02D 9/1035
USPC ....................... 123/470, 73 C, 390, 391, 402
See application file for complete search history.

(56) References Cited

U.S. PATENT DOCUMENTS 6,585,235 B2 7/2003 Pattullo
9,631,736 B2 4/2017 Kus et al.
11,231,002 B2 1/2022 Abei et al.
11,578,688 B2 * 2/2023 Abei ...................... F02M 51/02

* cited by examiner

*Primary Examiner* — Hai H Huynh
(74) *Attorney, Agent, or Firm* — DAY PITNEY LLP; George N. Chaclas; Anthony A. Kassas

(57) ABSTRACT

A charge forming device for a combustion engine includes a throttle body having a throttle bore, an air passage having at least a portion in which air flows separate from the throttle bore and a throttle valve with a valve head movable relative to the throttle body. A nozzle body has a fuel passage and a feed passage, the fuel passage is arranged to receive fuel that exits a fuel outlet of a fuel metering valve, and the fuel passage is communicated with a fuel chamber through which fluid flows into the throttle bore, and the feed passage is communicated with the air passage to receive air from the air passage and the feed passage is communicated with the fuel passage upstream of the fuel chamber, wherein air in the feed passage is mixed with fuel in the fuel passage upstream of the fuel chamber.

20 Claims, 8 Drawing Sheets

FUEL AND AIR CHARGE FORMING DEVICE

REFERENCE TO RELATED APPLICATIONS

This application is a continuation of U.S. patent application Ser. No. 17/869,587 filed Jul. 20, 2022 and claims the benefit of U.S. Provisional Ser. No. 63/224,064 filed Jul. 21, 2021. The entire contents of these priority applications are incorporated herein by reference in their entireties.

TECHNICAL FIELD

The present disclosure relates generally to a fuel and air charge forming device such as may be used to provide a combustible fuel and air mixture to an engine.

BACKGROUND

A variety of fuel injection throttle body configurations are known for supplying a fuel and air mixture to an internal combustion engine to support its operation in which a liquid gasoline fuel is injected into a main bore at a relatively high pressure typically in the range of 6 to 40 psi and sometimes up to 80 psi or more above ambient atmospheric pressure to facilitate mixing or dispersion of the liquid fuel in the fuel and air mixture supplied to the engine. A fuel pump is communicated with a pressure regulator and supplies liquid fuel at this high pressure to a fuel metering valve or injector which is opened and closed to discharge the appropriate quantity of fuel into the main bore for the current operating condition of the engine. The high pressure fuel flows at high velocity and mixes well with air to improve combustion. At lower pressures, fuel flow is slower and among other things there is a need to improve mixing of fuel and air in lower pressure fuel supply devices.

SUMMARY

In at least some implementations, a charge forming device for a combustion engine includes a throttle body, a throttle valve, a fuel metering valve and a nozzle body. The throttle body has a throttle bore with an inlet through which air flows into the throttle bore, an outlet from which a fuel and air mixture exits the throttle bore, and an air passage in which air flows separate from the throttle bore. The throttle valve has a valve head received within the throttle bore and movable relative to the throttle body between a first position and a second position wherein the flow area between the valve head and the throttle body is greater when the valve head is in the second position than in the first position. The fuel metering valve is mounted on the throttle body and has a valve element and a fuel outlet, the valve element is movable relative to a valve seat to control fuel flow through the fuel outlet. And the nozzle body is carried by the throttle body and has a fuel passage and a feed passage. The fuel passage is arranged to receive fuel that exits the fuel outlet, and the fuel passage is communicated with a fuel chamber through which fluid flows into the throttle bore. The feed passage is communicated with the air passage to receive air from the air passage and the feed passage is communicated with the fuel passage upstream of the fuel chamber. Air in the feed passage is mixed with fuel in the fuel passage upstream of the fuel chamber.

In at least some implementations, the nozzle body is received within a cavity in the throttle body, and the fuel chamber is defined between an end of the nozzle body and a surface of the throttle body that defines part of the cavity. The nozzle body may include a nozzle body outlet through which a mixture of fuel and air flows into the fuel chamber, and wherein a distance between the end of the nozzle body and the surface that defines the cavity is equal to or less than a diameter of the nozzle body outlet. The nozzle body may include a nozzle body outlet through which a mixture of fuel and air flows into the fuel chamber, and wherein a flow area of the nozzle body outlet is between 15% and 45% of the volume of the fuel chamber. The surface of the throttle body that defines part of the cavity may be part of a wall, wherein the wall includes fuel outlets through which fuel flows into the throttle bore.

In at least some implementations, the nozzle body is mounted to the throttle body with a liquid tight seal between the nozzle body and the throttle body.

In at least some implementations, the feed passage intersects the fuel passage within the nozzle body. The feed passage may extend from an exterior of the nozzle body into an interior of the nozzle body. The feed passage may include an inlet that has a flow area that is larger than a portion of the feed passage downstream from the inlet to increase air velocity from the inlet to said portion of the feed passage downstream from the inlet.

In at least some implementations, the fuel passage includes a first portion and a second portion, the first portion has a smaller flow area than the second portion to change the velocity and pressure of fuel flowing through the fuel passage. The feed passage may intersect the fuel passage within the second portion, with the first portion upstream of the second portion relative to the direction of fuel flow through the fuel passage.

In at least some implementations, a charge forming device for a combustion engine includes a throttle body having a throttle bore with an inlet through which air flows into the throttle bore, an outlet from which a fuel and air mixture exits the throttle bore, and an air passage in which air flows separate from the throttle bore. A throttle valve has a valve head received within the throttle bore and movable relative to the throttle body between a first position and a second position wherein the flow area between the valve head and the throttle body is greater when the valve head is in the second position than in the first position. A fuel metering valve is mounted on the throttle body and has a valve element and a fuel outlet, the valve element is movable relative to a valve seat to control fuel flow through the fuel outlet. A nozzle body is carried by the throttle body and has a fuel passage and a nozzle body outlet, the fuel passage is arranged to receive fuel that exits the fuel outlet and route that fuel to the nozzle body outlet from which fuel exits the nozzle body. A fuel chamber is downstream of the nozzle body outlet and fuel from the fuel passage and air from the air passage is received in the fuel chamber prior to a fuel and air mixture being discharged from the fuel chamber and into the throttle bore.

In at least some implementations, the nozzle body includes a feed passage that communicates with both the air passage and the fuel passage to provide air into the fuel passage upstream of the nozzle body outlet. The feed passage may intersect the fuel passage within the nozzle body. The feed passage may have a first portion with a smaller flow area than a second portion upstream of the first portion with respect to the direction of air flow through the feed passage, and the first portion is upstream of the intersection with the fuel passage. The fuel passage may include a first portion with a larger flow than a second portion of the fuel passage, the first portion is downstream of the second portion with respect to the direction of fuel flow in the fuel passage, and the feed passage intersects the fuel passage in said first portion of the fuel passage.

In at least some implementations, the nozzle body is received within a cavity in the throttle body, and the fuel chamber is defined between an end of the nozzle body and a surface that defines part of the cavity. The nozzle body may include a nozzle body outlet through which a mixture of fuel and air flows into the fuel chamber, and wherein a distance between the end of the nozzle body and the surface that defines the cavity is equal to or less than a diameter of the nozzle body outlet. The nozzle body may include a nozzle body outlet through which a mixture of fuel and air flows into the fuel chamber, and wherein a flow area of the nozzle body outlet is between 15% and 45% of the volume of the fuel chamber.

In at least some implementations, a charge forming device for a combustion engine, includes a throttle body having a throttle bore with an inlet through which air flows into the throttle bore, an outlet from which a fuel and air mixture exits the throttle bore, and an air passage having at least a portion in which air flows separate from the throttle bore. A throttle valve has a valve head received within the throttle bore and movable relative to the throttle body between a first position and a second position wherein the flow area between the valve head and the throttle body is greater when the valve head is in the second position than in the first position. A fuel metering valve has a valve element and a fuel outlet, the valve element is movable relative to a valve seat to control fuel flow through the fuel outlet. And a nozzle body has a fuel passage and a feed passage, the fuel passage is arranged to receive fuel that exits the fuel outlet, and the fuel passage is communicated with a fuel chamber through which fluid flows into the throttle bore, and the feed passage is communicated with the air passage to receive air from the air passage and the feed passage is communicated with the fuel passage upstream of the fuel chamber, wherein air in the feed passage is mixed with fuel in the fuel passage upstream of the fuel chamber.

In at least some implementations, one or both of the air passage and the feed passage includes a reduced diameter portion that is upstream of where the feed passage is communicated with the fuel passage. In at least some implementations, a jet is provided in the air passage or in the feed passage and wherein the jet defines a minimum air flow area of both the air passage and the feed passage.

In at least some implementations, a charge forming device for a combustion engine, includes a throttle body having a throttle bore, an air passage having at least a portion in which air flows separate from the throttle bore, a throttle valve, and a nozzle body. The nozzle body has a fuel passage and a feed passage, and the fuel passage is arranged to receive fuel prior to that fuel entering the throttle bore. The nozzle body includes a nozzle body outlet that is communicated with a fuel chamber defined between the nozzle body and the throttle body and through which fluid flows into the throttle bore. The feed passage is communicated with the air passage to receive air from the air passage and the feed passage is communicated with the fuel passage upstream of the fuel chamber, wherein air in the feed passage is mixed with fuel in the fuel passage upstream of the fuel chamber.

BRIEF DESCRIPTION OF THE DRAWINGS

The following detailed description of certain embodiments and best mode will be set forth with reference to the accompanying drawings, in which.

DETAILED DESCRIPTION

Figure 1:
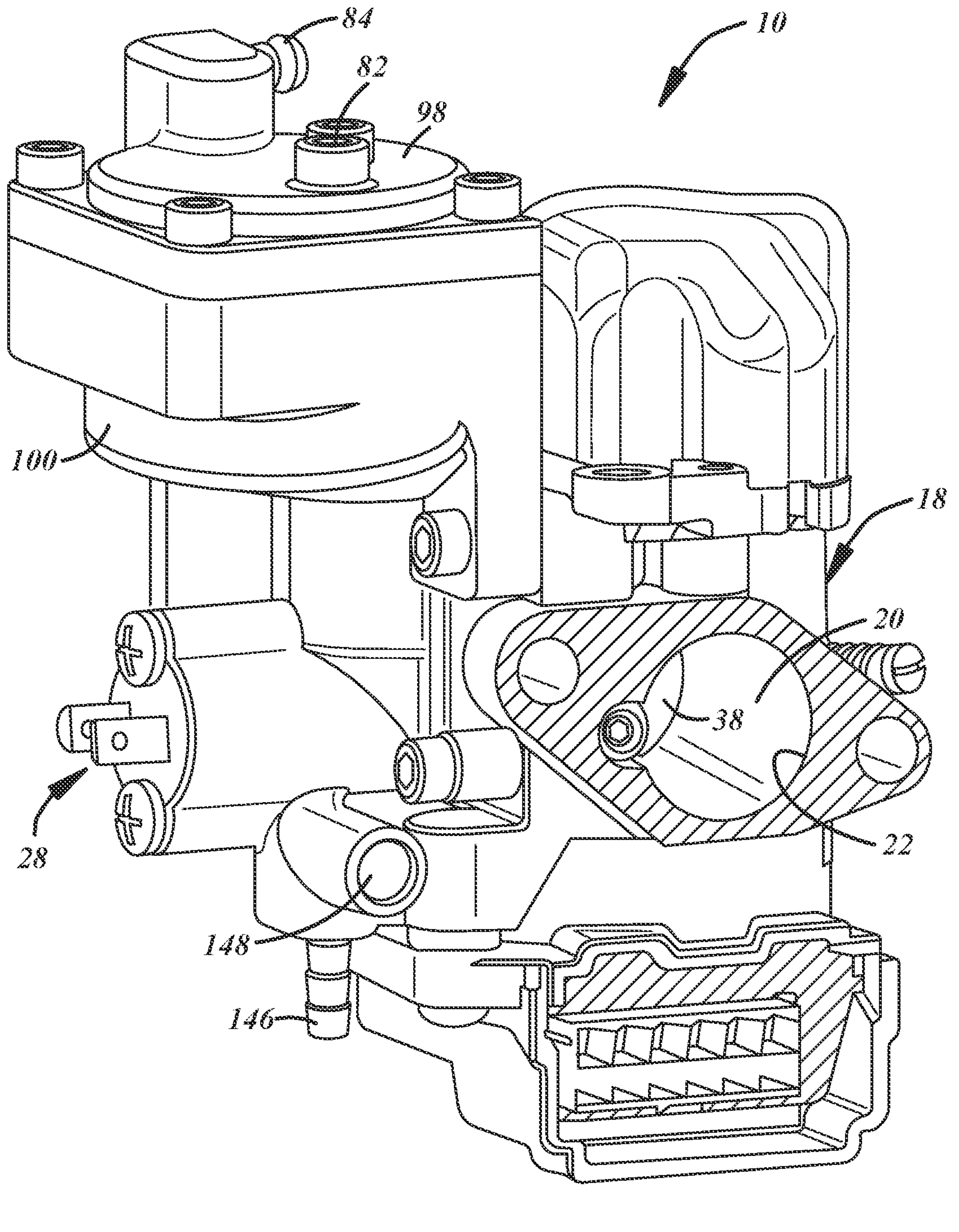
FIG. 1 is a perspective view of a throttle body assembly including a throttle body with a throttle valve, a metering valve that controls, at least in part, fuel flow in the assembly, and a fuel vapor separator.
Figure 2:
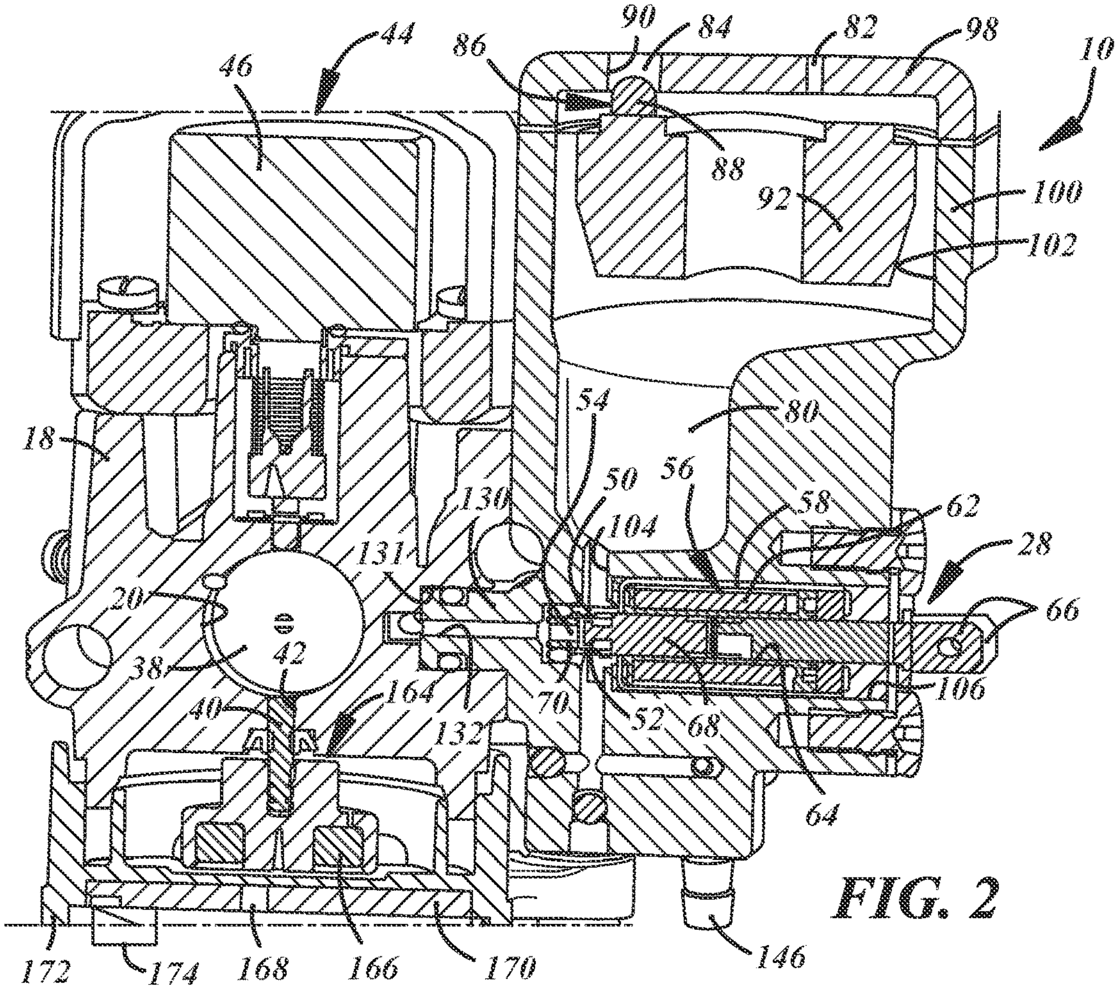
FIG. 2 is a fragmentary sectional view of the throttle body assembly.

Referring in more detail to the drawings, FIGS. 1 and 2 illustrate a charge forming device 10 that provides a combustible fuel and air mixture to an internal combustion engine to support operation of the engine. The charge forming device 10 may be utilized on a two or four-stroke internal combustion engine, and includes a throttle body assembly 10 from which air and fuel are discharged for delivery to the engine.

The assembly 10 includes a throttle body 18 that has a main bore, sometimes called a throttle bore 20, with an inlet 22 through which air is received into the throttle bore 20 and an outlet 24 connected or otherwise communicated with the engine (e.g. an intake manifold thereof). The inlet 22 may receive air from an air filter (not shown), if desired, and that air may be mixed with fuel provided from a fuel metering valve 28 carried by or communicated with the throttle body 18. The fuel and air mixture is delivered to a combustion chamber or piston cylinder of the engine during sequentially timed periods of a piston cycle. For a four-stroke engine application, as illustrated, the fluid may flow through an intake valve and directly into the piston cylinder. Alternatively, for a two-stroke engine application, typically air flows through the crankcase (not shown) before entering the combustion chamber portion of the piston cylinder through a port in the cylinder wall which is opened intermittently by the reciprocating engine piston.

Figure 3:
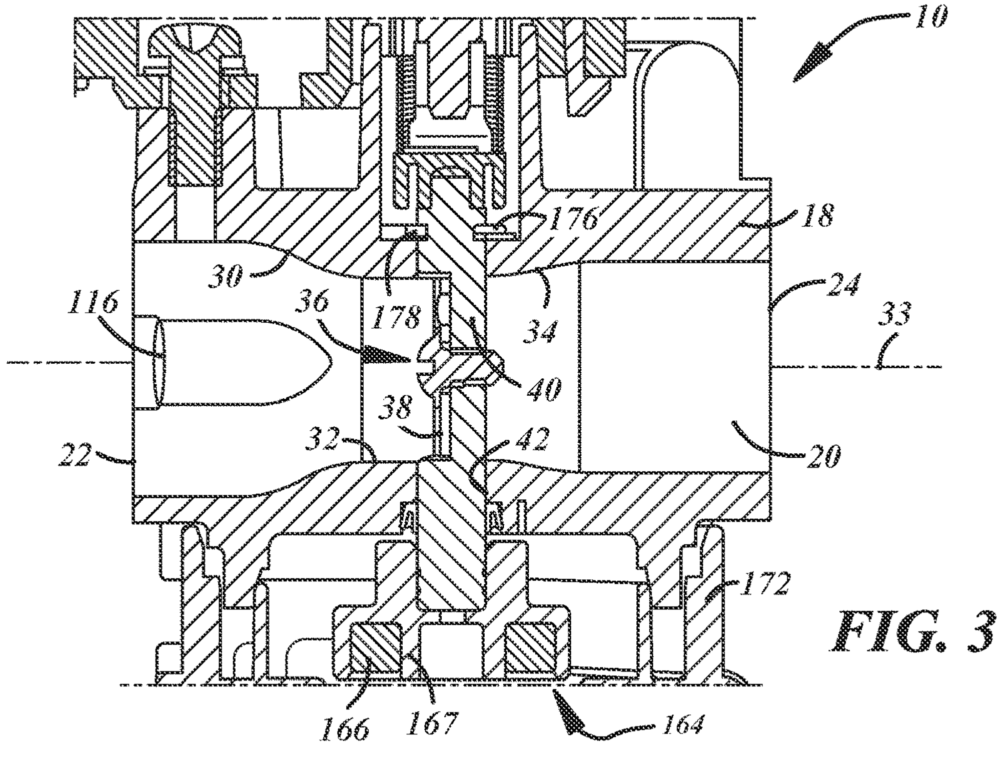
FIG. 3 is a fragmentary sectional view of the throttle body assembly illustrating the throttle valve and a throttle bore of the throttle body.
Figure 4:
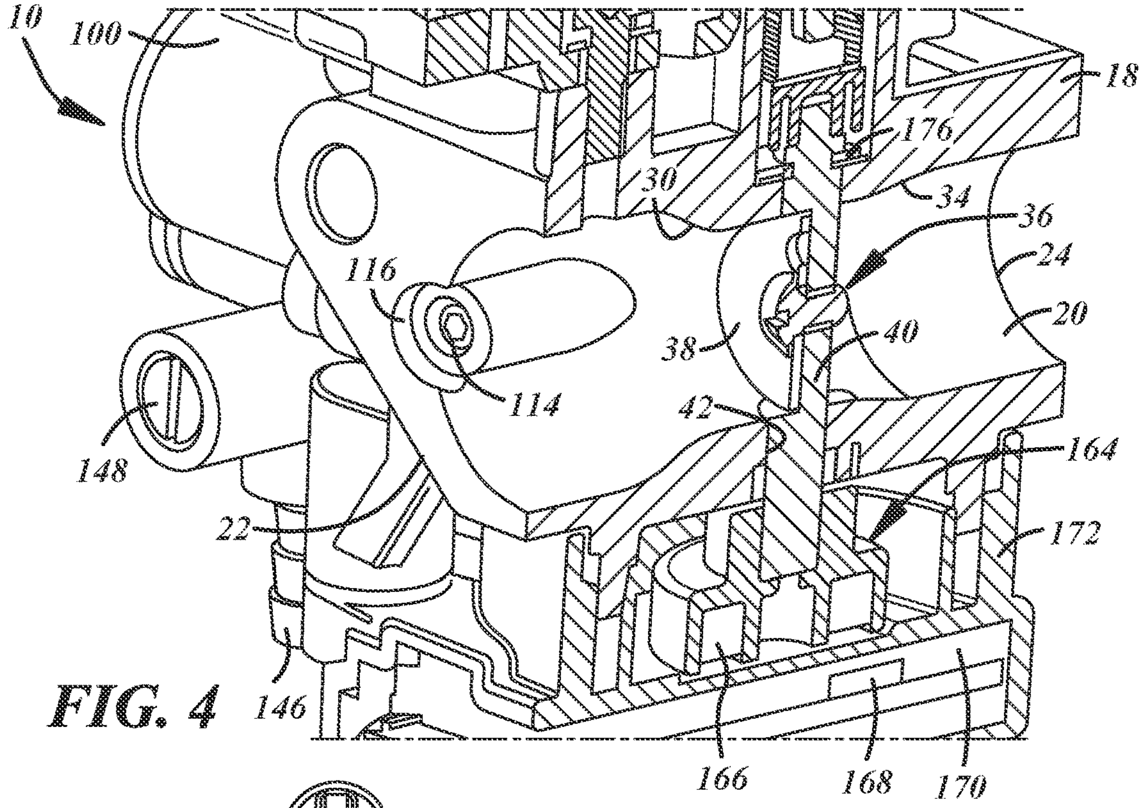
FIG. 4 is a fragmentary perspective and sectional view of the throttle body assembly.

The throttle bore 20 may have any desired shape including (but not limited to) a generally constant diameter cylinder or a venturi shape such as is shown in FIGS. 3 and 4. In the example having the venturi shape, the inlet 22 leads to a tapered converging portion 30 wherein the inner diameter or flow area of the bore 20 decreases and leads to a reduced diameter throat 32. In the area of the throat 32, the throttle bore 20 may have a minimum flow area which may be defined by the portion of the bore that has the smallest cross-sectional area perpendicular to an axis or centerline 33 of the throttle bore. The throat 32 leads to a tapered diverging portion 34 wherein the inner diameter or flow area of the bore 20 increases relative to the throat. The diverging portion is between the throat 32 and the outlet 24. The converging portion 30 may cause an increase in the velocity of air flowing into the throat 32 (relative to the inlet) and create or increase a pressure drop in the area of the throat 32. In at least some implementations, the throttle body 18 may be cast from a suitable metal and the throttle bore 20 may be defined within the body when the body is formed and/or further processing (e.g. machining) may be done to provide a desired shape of the throttle bore.

Referring to FIGS. 1-5, the air flow rate through the throttle bore 20 and into the engine is controlled by a throttle valve 36. In at least some implementations, the throttle valve 36 includes a head 38 which may include a flat plate disposed in the throttle bore 20 and coupled to a rotating throttle valve shaft 40. The shaft 40 extends through a shaft bore 42 that intersects and may be generally perpendicular to the throttle bore 20. The throttle valve 36 may be driven or moved by an actuator 44 between an idle position wherein the head 38 substantially blocks air flow through the throttle bore 20 and a fully or wide open position wherein the head 38 provides the least restriction to air flow through the throttle bore 20. In one example, the actuator 44 may be an electrically driven motor 46 (FIG. 2) coupled to the throttle valve shaft 40 to rotate the shaft and thus rotate the valve head 38 within the throttle bore 20. In another example, the actuator 44 may include a mechanical linkage, such as a lever attached to the throttle valve shaft 40 to which a Bowden wire may be connected to manually rotate the shaft 40 as desired.

The fuel metering valve 28 (FIGS. 2 and 5) may have an inlet 50 to which fuel is delivered, a valve element 52 (e.g. a valve head) that controls fuel flow rate and an outlet 54 downstream of the valve element 52. To control actuation and movement of the valve element 52, the fuel metering valve 28 may include or be associated with an electrically driven actuator 56 such as (but not limited to) a solenoid. Among other things, the solenoid 56 may include an outer casing 58, a coil 62 wrapped around a bobbin 64 received within the casing 58, an electrical connector 66 arranged to be coupled to a power source to selectively energize the coil 62, and an armature 68 slidably received within the bobbin 64 for reciprocation between advanced and retracted positions. The valve element 52 may be carried by or otherwise moved by the armature 68 relative to a valve seat 70 that may be defined within one or both of the solenoid 56 and the throttle body 18. When the armature 68 is in its retracted position, the valve element 52 is removed or spaced from the valve seat 70 and fuel may flow through the valve seat. When the armature 68 is in its extended position, the valve element 52 may be closed against or bears on the valve seat 70 to inhibit or prevent fuel flow through the valve seat. The solenoid 56 may be constructed as set forth in U.S. patent application Ser. No. 14/896,764, the disclosure of which is incorporated herein in its entirety. The outlet 54 may be centrally or generally coaxially located with the valve seat 70, and an inlet 50 may be radially outwardly spaced from the outlet 54 and generally radially oriented. Of course, other metering valves, including but not limited to different solenoid valves or commercially available fuel injectors, may be used instead if desired in a particular application.

Fuel may be provided from a fuel source to the metering valve inlet 50 and, when the valve element 52 is not closed on the valve seat 70, fuel may flow through the valve seat and the metering valve outlet 54 and to the throttle bore 20 to be mixed with air flowing therethrough and to be delivered as a fuel and air mixture to the engine. The fuel source may provide fuel at a desired pressure to the metering valve 28. In at least some implementations, the pressure may be ambient or generally atmospheric pressure.

To provide fuel to the metering valve inlet 50, the throttle body 18 may include an inlet fuel chamber 80 (FIGS. 2 and 8) into which fuel is received from a fuel supply, such as a fuel tank. The throttle body assembly 10 may include a fuel inlet 84 (FIGS. 1 and 2) leading to the inlet fuel chamber 80. In a system wherein the fuel pressure is generally at atmospheric pressure, the fuel flow may be fed under the force of gravity to the inlet fuel chamber 80. In at least some implementations, the inlet fuel chamber 80 may be maintained at or near atmospheric pressure by a vent 82 and a valve assembly 86 (a simplified form of which is shown in FIG. 2). The valve assembly 86 may include a valve 88 and may include or be associated with a valve seat 90 so that the valve 88 is selectively engageable with the valve seat 90 to inhibit or prevent fluid flow through the valve seat, as will be described in more detail below. The valve 88 may be coupled to an actuator 92 that moves the valve 88 relative to the valve seat 90, as will be set forth in more detail below. The vent 82 may be communicated with the engine intake manifold, with a carbon canister/air cleaner to reduce evaporative emissions or elsewhere (e.g. by a conduit) as desired so long as the desired pressure within the inlet fuel chamber 80 is achieved in use. The level of fuel within the inlet fuel chamber 80 may provide a head or pressure of the fuel that may flow through the metering valve 28 when the metering valve is open, which may supplement fuel flow caused by a subatmospheric pressure signal in the throttle bore 20 and communicated with the fuel when the metering valve is open, as will be described in more detail below.

To maintain a desired level of fuel in the inlet fuel chamber 80, the valve 88 is moved relative to the valve seat 90 by the actuator 92 (e.g. a float in the example shown) that is received in the inlet fuel chamber 80 and responsive to the level of fuel in the inlet fuel chamber. The float 92 may be buoyant in fuel and pivotally coupled to the throttle body 18 and the valve 88 may be connected to the float 92 for movement as the float moves in response to changes in the fuel level within the inlet fuel chamber 80. When a desired maximum level of fuel is present in the inlet fuel chamber 80, the float 92 has been moved to a position in the inlet fuel chamber wherein the valve 88 is engaged with and closed against the valve seat 90, which closes the fuel inlet 84 and prevents further fuel flow into the inlet fuel chamber 80. As fuel is discharged from the inlet fuel chamber 80 (e.g. to the throttle bore 20 through the metering valve 28), the float 92 moves in response to the lower fuel level in the inlet fuel chamber and thereby moves the valve 88 away from the valve seat 90 so that the fuel inlet 84 is again open. When the fuel inlet 84 is open, additional fuel flows into the inlet fuel chamber 80 until a maximum level is reached and the fuel inlet 84 is again closed.

The inlet fuel chamber 80 may also serve to separate liquid fuel from gaseous fuel vapor and air. Liquid fuel will settle into the bottom of the inlet fuel chamber 80 and the fuel vapor and air will rise to the top of the inlet fuel chamber where the fuel vapor and air may flow out of the inlet fuel chamber through the vent 82 (and hence, be delivered into the intake manifold and then to an engine combustion chamber).

Figure 8:
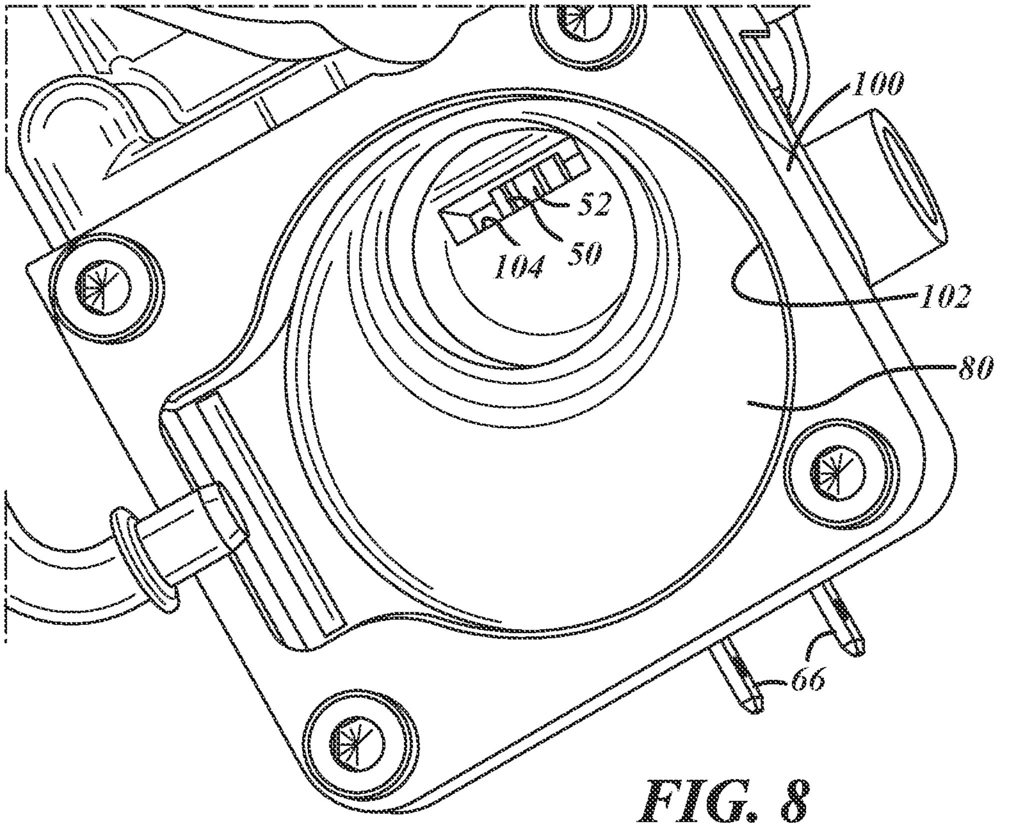
FIG. 8 is a fragmentary perspective view showing a vapor separator chamber with a cover and other components removed to show a fluid port that communicates the separator chamber with the metering valve.

The inlet fuel chamber 80 may be defined at least partially by the throttle body 18, such as by a recess formed in the throttle body, and a cover 98 carried by the throttle body. Alternatively, as shown in FIGS. 1, 2 and 8, the throttle body assembly 10 may include a second body 100 that is coupled to the throttle body 18 and which defines part or all of the fuel chamber 80 with the cover 98 on the second body. In the example shown, the second body 100 includes a cavity 102 that defines the fuel chamber 80 and that is separate from the throttle body 18 and entirely defined within the second body 100. An outlet 104 of the inlet fuel chamber 80 leads to the metering valve inlet 50. The metering valve 28 may be carried by the second body 100 in at least some implementations such as by being received in a bore or second cavity 106 (FIGS. 2 and 5) formed in the second body 100. The second cavity 106 and fuel chamber 80 are communicated with each other by the outlet 104. So that fuel is available at the metering valve 28 at all times when fuel is within the inlet fuel chamber 80, the outlet 104 may be an open passage without any intervening valve, in at least some implementations. The outlet 104 may extend from the bottom or a lower portion of the inlet fuel chamber 80 so that fuel may flow under atmospheric pressure to the metering valve 28. A filter or screen may be provided at or in the outlet 104, if desired. One or more other filters may instead or in addition be provided elsewhere in the fuel system generally and in the throttle body, as desired.

The open outlet 104 may also permit any air or fuel vapor generated downstream of the fuel chamber 80, for example in the outlet 104 or at the metering valve 28, to flow into the fuel chamber 80. As noted above, the gaseous matter may then be vented from the fuel chamber 80. When the fuel metering valve 28 is electrically actuated, such as by a solenoid, heat may be generated in use of the valve 28 and that heat may tend to vaporize part of the fuel that comes into contact with the metering valve/solenoid. Without venting that vapor, the fuel flow from the metering valve 28 to the throttle bore 20 may be less consistent than desired as vapor bubbles enter the liquid fuel flow. In at least some implementations, such as shown in FIG. 2, the outlet 104 of the fuel chamber 80 communicates with the metering valve inlet 50 and with a portion of the solenoid housing 58 that includes the coil 62 of the solenoid. In the example shown, the metering valve inlet 50 is axially spaced from end of the coil 62 nearest to the inlet 50 and the outlet 104 overlies and spans the area between the valve inlet 50 and end of the coil 62. Hence, heat from the coil 62 may be transferred to the fuel, to reduce the temperature of the solenoid, and any fuel vapor generated as a result may be vented as set forth above.

In use of the throttle body assembly 10, a fuel circuit is defined between the inlet fuel chamber 80 and the throttle bore 20. Fuel is maintained in the inlet fuel chamber 80 as described above and thus, in the outlet 104 and the cavity 106 in which the metering valve 28 is received (and perhaps within a portion of the metering valve upstream of the valve seat 70). When the metering valve 28 is closed, there is no, or substantially no, fuel flow through the valve seat 70 and so there is no fuel flow to the metering valve outlet 54 or to the throttle bore 20. To provide fuel to the engine, the metering valve 28 is opened and fuel flows into the throttle bore 20, is mixed with air and is delivered to the engine as a fuel and air mixture.

To reduce the distance that fuel must travel to reach the throttle bore 20, or for other reasons, the metering valve outlet 54 may communicate with a cavity or pocket that defines at least part of a fuel chamber 110 (FIG. 5) formed in the throttle body 18 within 20 mm of the throttle bore. The fuel chamber 110 may be communicated with the throttle bore 20 by one or more fuel outlets 112. The fuel outlets 112 may be simple passages or bores formed in the throttle body 18 between the throttle bore 20 and the fuel chamber 110, and/or metering jets including a desired orifice size formed in an insert may be inserted into the throttle body. The outlets 112 may be provided in the area of the venturi throat 32 wherein a maximum fluid velocity and a maximum pressure drop may be achieved within the throttle bore 20 to provide an increased fluid flow into the throttle bore at relatively small pressure differential (pressure difference between the fuel chamber 80 and throttle bore 20). The increased pressure signal and resulting fluid flow rate may also improve the mixing of liquid fuel with the air flowing through the throttle bore 20 to provide a more consistent fuel mixture to the engine to improve the combustion in the engine.

Further, the throttle valve 36 may also be provided in the throttle bore throat 32. This further reduces the flow area in the throat 32 and further increases fluid velocity as a result. When the throttle valve 36 is in a first or idle position, as is shown in FIGS. 3-7, the valve head 38 is nearly perpendicular to the axis 33 of the throttle bore 20 and a minimum flow area is provided between the valve head 38 and throttle body 18. Additional fluid flow may be provided by one or more openings through the valve head 38, if desired. In at least some implementations, at least one fuel outlet 112 is located upstream of the throttle valve head 38 when the throttle valve 36 is in the idle position, that is, between the throttle bore inlet 22 and the valve head 38 when the throttle valve 36 is in its idle position. In at least some implementations, at least one fuel outlet 112 is located downstream of the throttle valve head 38 when the throttle valve 36 is in the idle position, that is, between the throttle bore outlet 24 and the valve head 38 when the throttle valve 36 is in its idle position. In the implementation shown, two fuel outlets 112 are upstream and one fuel outlet 112 is downstream of the throttle valve 36 when in the idle position. In at least some implementations, the fuel outlets 112 are defined by separate, spaced apart bores in the throttle body 18 that extend between the throttle bore 20 and the fuel chamber 110, and which may be substantially perpendicular to the axis 33 of the throttle bore 20, substantially parallel to the direction of movement of the metering valve 28 between its opened and closed positions, and less than 20 mm in length. As used herein "substantially" means within 10 degrees of the stated orientation (e.g. within 10 degrees of perpendicular or parallel to the noted reference).

Further, as shown in FIGS. 4-7, an air passage 114 may be provided in the throttle body 18. The air passage 114 may have an inlet 116 separate from the throttle bore 20 and an outlet 118 that communicates with the fuel chamber 110, which is downstream of the metering valve 28 and upstream of the fuel outlets 112 to the throttle bore 20. In the example shown, the air passage 114 leads from the inlet end 22 of the throttle body 18 and to the fuel chamber 110.

As shown in FIGS. 4-7, an insert or jet 120 with a passage or orifice 122 of a desired size may be provided in the air induction passage 114. The jet 120 may be a separate body press-fit or otherwise installed into the passage 114 and air may flow through the orifice 122 before reaching the metering valve 28. The flow area of passages downstream of the jet 120 may be greater in size than the minimum flow area of the jet so that the jet provides the maximum restriction to air flow through the induction passage 114. Instead of or in addition to the jet 120, a passage of suitable size may be drilled or otherwise formed in the throttle body 18 to define a maximum restriction to air flow through the induction passage 114. Use of a jet 120 may facilitate use of a common throttle body design with multiple engines or in different engine applications wherein different air flow rates may be needed. To achieve the different flow rates, different jets 120 having orifices 122 with different effective flow areas may be inserted into the throttle bodies 18 while the remainder of the throttle body may be the same. Also, different diameter passages may be formed in the throttle body 18 in addition to or instead of using a jet 120, to accomplish a similar thing. The insert or jet may also include, carry or be associated with a check valve that permits air flow to the fuel chamber 110 but prevents fluid flow out of the air passage inlet 116 in the reverse direction to inhibit or prevent fuel from leaking out of the induction passage 114 (e.g. if fuel remains in the fuel chamber 110 after the engine stops operating). Further, in some applications the air induction passage 114 may be capped or plugged to prevent air flow therein.

Figure 5:
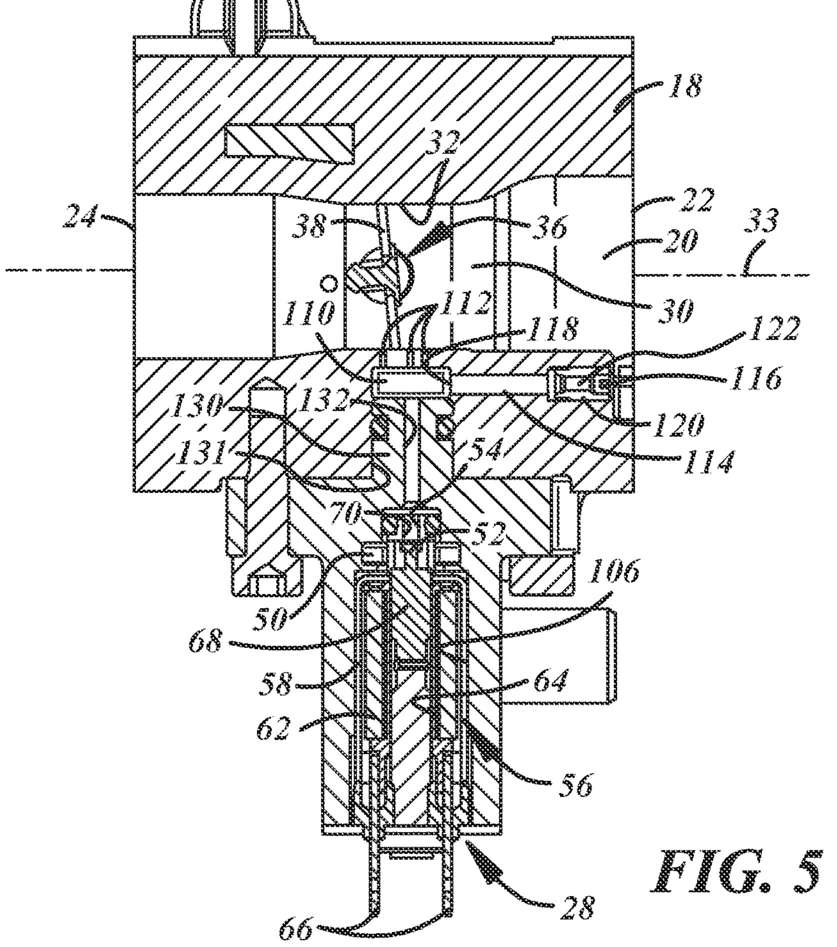
FIG. 5 is a fragmentary sectional view of the throttle body assembly showing the metering valve coupled to the throttle body.

In the example shown in FIGS. 2 and 5, the metering valve 28 is carried by the second body 100. The second body 100 includes a projection 130 or end that is received within and sealed (such as by an o-ring) to a cavity 131 in the throttle body 18. The fuel outlet 54 from the metering valve leads to a passage 132 that extends through the projection 130 and communicates with the fuel chamber 110 that is defined in the cavity 131 between the end of the projection 130 and the throttle body 18, specifically the wall of the throttle body 18 that includes the fuel outlets 112 that lead to the throttle bore 20. Hence, fuel from the metering valve 28 and air from the air passage 114 are combined within the fuel chamber 110 upstream of the throttle bore 20, and that mixture then flows through the fuel outlets 112 and is mixed with air flowing through the throttle bore 20 to provide a mixture of fuel dispersed within air. The air passage 114 opens into the fuel chamber 110 independently and spaced from the projection 130, although the projection could include an opening, passage or other void that defines part of the air passage, if desired.

Figure 6:
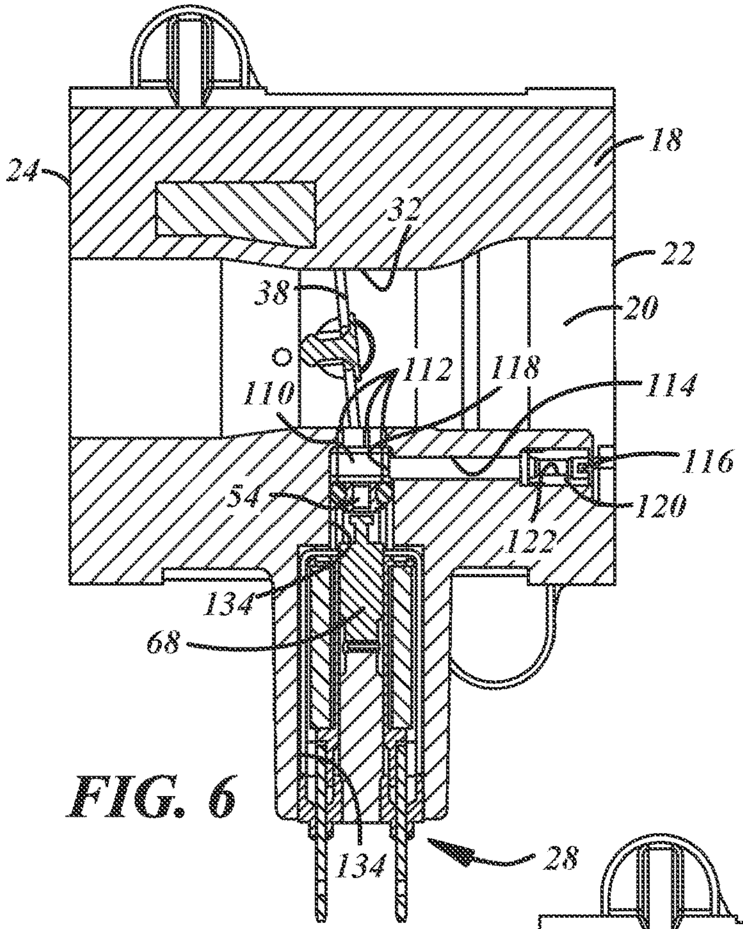
FIG. 6 is a fragmentary sectional view of the throttle body assembly showing an alternate metering valve arrangement.

In the example shown in FIG. 6, the metering valve 28 is carried by the throttle body 18, in a cavity 134 formed in the throttle body 18, and the metering valve 28 is separate from the second body 100. Seals are provided between the throttle body 18 and the fuel inlet 50 and fuel outlet 54 of the metering valve 28 to prevent fuel leaking out of the throttle body 18 around the metering valve. In this example, the fuel chamber 110 is defined in the cavity 131 which is open to and may be a counterbore of cavity 134, between the metering valve outlet 54 and the throttle body 18, specifically the wall of the throttle body 18 that includes the fuel outlets 112 that lead to the throttle bore 20. The air passage 114 opens into the fuel chamber 110 independently and spaced from the metering valve 28, although the metering valve (e.g. a housing thereof) could include an opening, passage or other void that defines part of the air passage, if desired.

Figure 7:
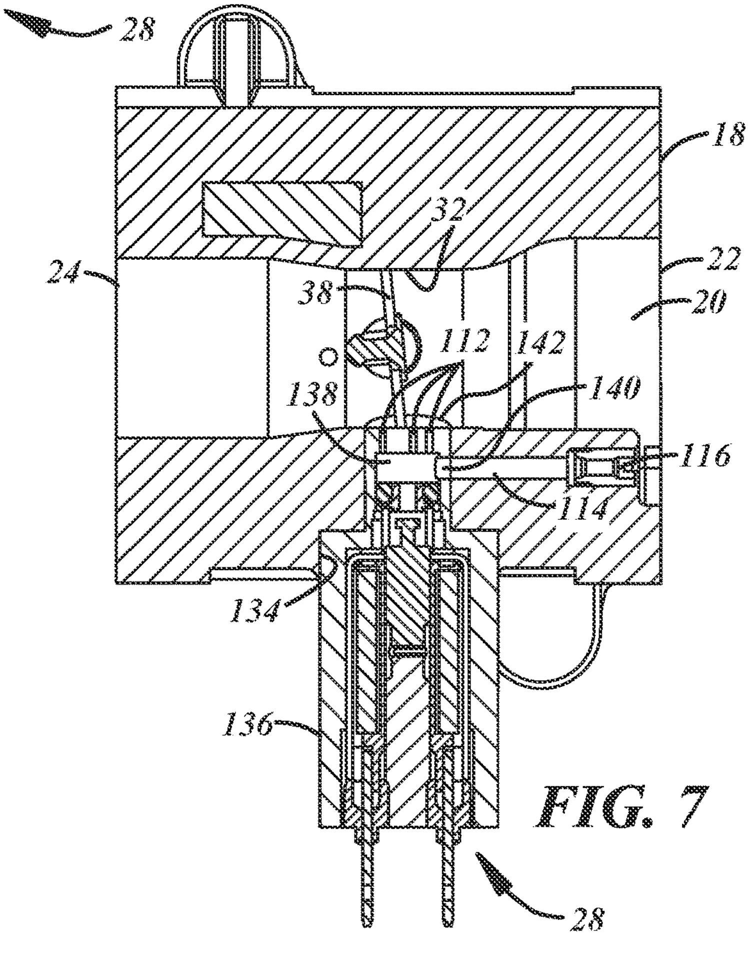
FIG. 7 is a fragmentary sectional view of the throttle body assembly showing an alternate metering valve arrangement.

In the example shown in FIG. 7, the metering valve 28 is carried by a housing 136 having a portion received within a cavity 134 in the throttle body 18. The housing 136 could be the second body 100, or as shown in FIG. 7, a body that prior to assembly is separate from the throttle body 18 and second body 100. The housing 136 may include an open area 138 that defines all or part of the fuel chamber. The housing 136 may also include an opening or passage 140 that communicates with the air passage 114 and/or defines part of the air passage to receive air into the fuel chamber 138 from the air passage 114. The jet 120 or other flow controller may be carried by the housing 136, or by the throttle body 18 as previously described, to control flow into the fuel chamber 138 from the air passage 114. Finally, the housing 136 may include an end wall 142 that includes openings therethrough that define the fuel outlets 112 through which air and fuel flow from the fuel chamber 138 into the throttle bore 20. As such, the end wall 142 of the housing 136 may extend into or define part of the throttle bore 20. An outer surface of the end wall 142 may be contoured to provide a desired shape and size of the throttle bore 20 in the area of the fuel outlets 112 and throttle valve, to enhance fluid flow through the throttle bore. This modular design permits the fuel chamber 138, air passage 114 (e.g. the jet) and fuel outlet size 112, orientation and general arrangement to be changed by simply changing the housing 136 that carries the metering valve 28. Hence, the same throttle body 18 could be used with different metering valves 28, fuel chamber 138, air passage 114 and fuel outlet 112 arrangements. Further, other features and components, like a fuel drain 146 and drain valve 148 (FIGS. 1 and 4) may be received in or carried by the second body 100. The fuel drain 146 may permit the fuel in the inlet chamber 80 to be drained to facilitate repair of the throttle body 18 without fuel leakage (e.g. when removing the metering valve 28) or to remove fuel from the inlet fuel chamber 80 when the engine is not operating to reduce fuel vapor emissions from the throttle body assembly 10. Instead of being part of the second body 100, the fuel drain 146 could be carried by the throttle body 18.

Figure 15:
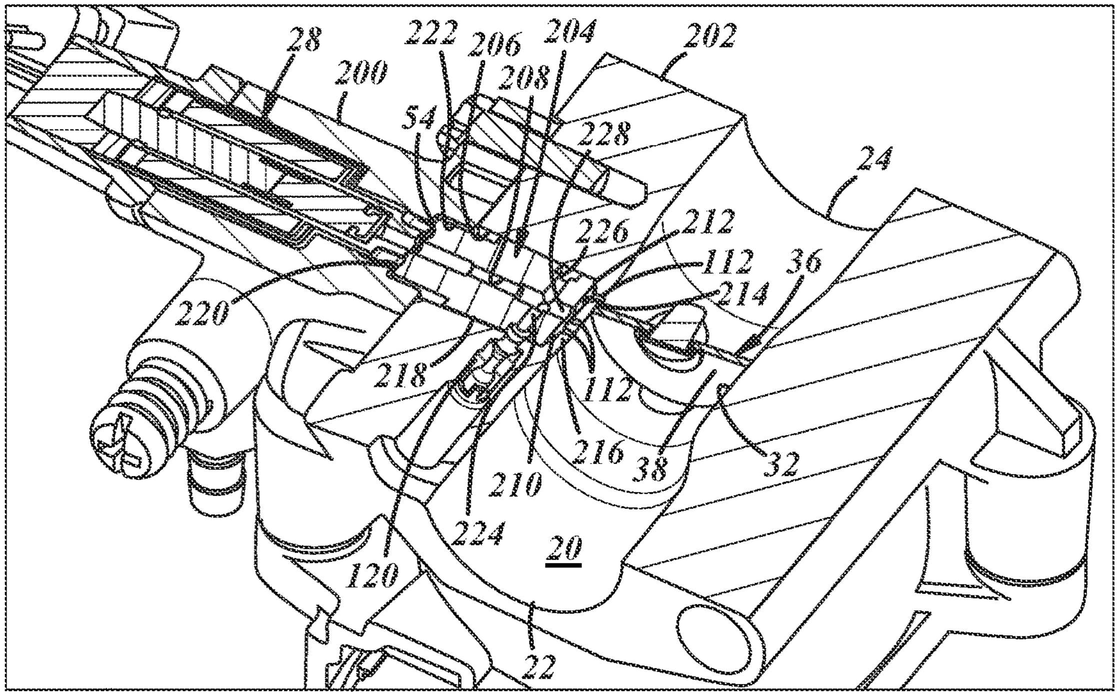
FIG. 15 is a fragmentary sectional view of the throttle body assembly showing the metering valve coupled to the throttle body and providing fuel through a nozzle body.
Figure 16:
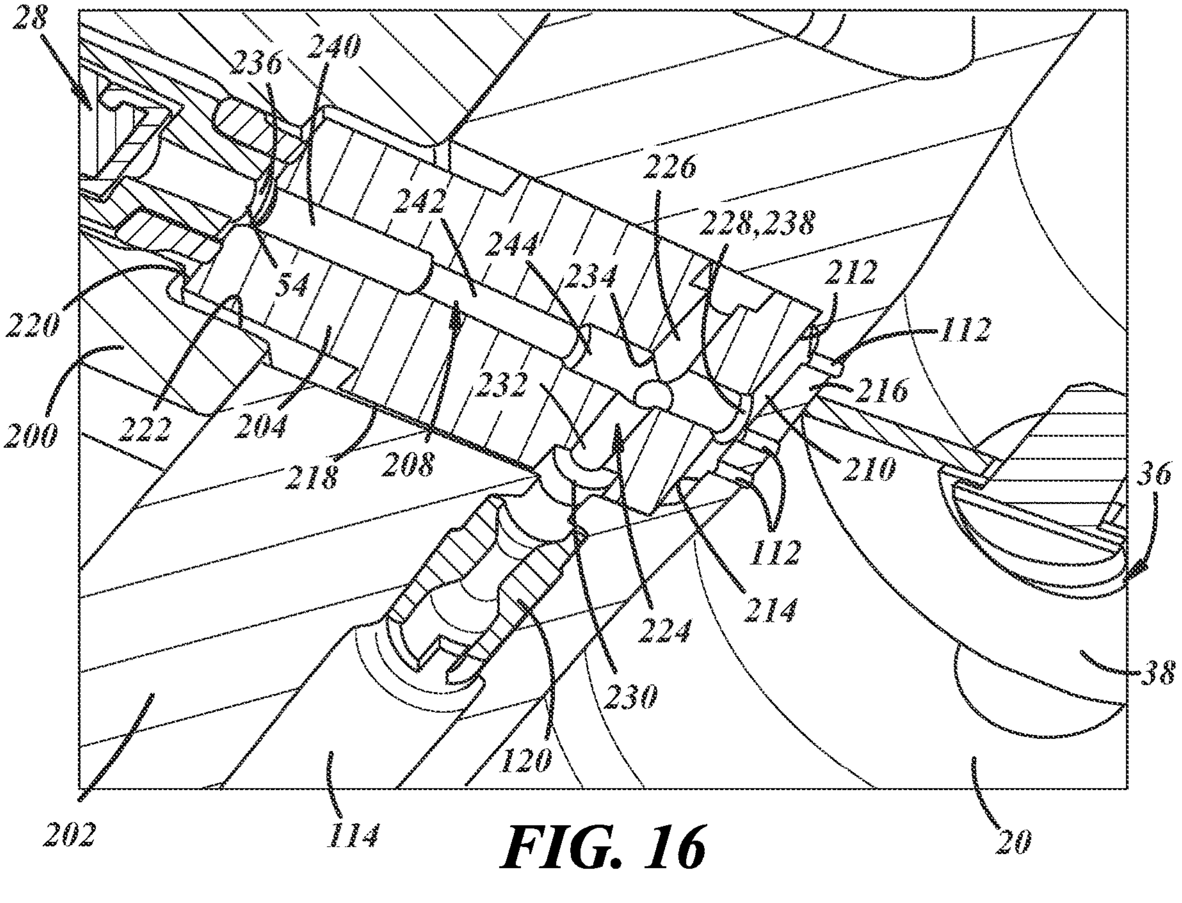
FIG. 16 is an enlarged, fragmentary sectional view of a portion of the throttle body and the nozzle body.

In at least some implementations, such as is shown in FIGS. 15 and 16, the metering valve 28 is carried by a second body 200 mounted to the throttle body 202 and a nozzle body 204 is received in a cavity 206 in the throttle body 202. The throttle body 202 and metering valve 28 may be the same or similar to those components already described with reference to other embodiments and in the drawings, the same reference numbers have been used to identify similar components (e.g. the throttle valve 36, head 38, throttle bore 20 and its inlet 22 and outlet 24, fuel outlets 112, air passage 114 and others). The fuel outlet 54 from the metering valve 28 leads to a fuel passage 208 that extends through the nozzle body 204 and communicates with a fuel chamber 210 defined in the cavity 206 between a first end 212 of the nozzle body 204 and a surface 214 of the throttle body 202 that defines part of the cavity 206, specifically the wall 216 of the throttle body 18 that includes fuel outlets 112 that lead to the throttle bore 20 of the throttle body 202. Thus, the nozzle body 204 and its fuel passage 208 are located in a fuel flow path between the metering valve fuel outlet 54 and the throttle bore 20. The nozzle body 204 may have any desired size and shape and may be sealed within the cavity 206, such as by a press-fit, interference fit, o-ring or other sealing component, potting, adhesive, weld or the like, to prevent fuel from leaking between an exterior 218 of the nozzle body 204 and throttle body 202. A second end 220 of the nozzle body 204 may extend out of the throttle body 202 and may be received in a cavity 222 of the second body 200. Any desired sealing arrangement may be provided between the nozzle body 204 and the second body 200 to prevent fuel leakage. While the first end 212 of the nozzle body 204 that defines part of the fuel chamber 210 is shown as being flat, circular and parallel to the surface 214 of the throttle body 202 that defines part of the cavity 206, the first end 212 of the nozzle body 204 may be shaped and arranged as desired to provide a fuel chamber having a desired size and to provide desired fluid flow characteristics.

The nozzle body 204 includes a feed passage 224 aligned with and open to an air passage 114 in the throttle body 202 in which a flow of air is provided that is separate from the throttle bore 20. In at least some implementations, the feed passage 224 extends from the exterior 218 of the nozzle body 204 into an interior of the nozzle body and the feed passage 224 intersects the fuel passage 208 within the nozzle body. In the direction of air flow to the throttle bore 20 from the air passage 114, the feed passage 224 is downstream of the jet 120 or other orifice or restriction that restricts air flow in the air passage 114. Of course, the jet 120 or orifice or restriction may be defined within the nozzle body 204, in the same piece of material that defines the feed passage 224 and fuel passage 208, and need not be a separate component as shown in the drawings. The feed passage 224 may be formed by a cross-drilled passage in the nozzle body 204, and may extend through the nozzle body. A portion 226 of the feed passage 224 downstream of the fuel passage 208, relative to the direction of air flow into the feed passage 224, may provide an area in which fuel and air are mixed prior to exiting the nozzle body 204 through a nozzle body outlet 228 that leads to the fuel chamber 210.

Further, while the feed passage 224 and fuel passage 208 are shown in the illustrated embodiment as being perpendicular to each other, the passages 224, 208 may be arranged at any desired angle, and different angles may be chosen to, for example, provide a desired fluid velocity and mixing of the fuel and air. Further, as shown in FIG. 16, the feed passage 224 may have an enlarged inlet 230 that leads to a smaller flow area portion 232 upstream of the junction 234 with the fuel passage 208. The enlarged inlet 230 may have a flow area the same as or similar to the flow area of the portion of the air passage 114 immediately upstream of the inlet 230, and the smaller flow area portion 232 may increase the velocity of the air as the air flows to the junction 234 with the fuel passage 208 and is then mixed with fuel flowing in the fuel passage 208. In at least some implementations, the smaller flow area portion 232 has a flow area greater than the minimum flow area of the jet 120 or other restriction in the air passage, if such a jet or restriction is provided. Of course, other arrangements may be used, as desired, including but not limited to a feed passage 224 having a constant flow area.

In at least some implementations, fuel from the metering valve 28 and air from the air passage 114 are combined within the nozzle body 204 at the junction 234 or intersection of the feed passage 224 and fuel passage 208. A combined and mixed flow of fuel and air exits the nozzle body 204 via the nozzle body outlet 228 that is open to the fuel chamber 110 upstream of the throttle bore 20. The fuel and air from the nozzle body 204 flows into the fuel chamber 110 and then out of the fuel outlets 112 and is mixed with air flowing through the throttle bore 20 to provide a mixture of fuel dispersed within air.

In at least some implementations, initial mixing of air and fuel occurs within the fuel passage 208 at the junction 234 with the feed passage 224. The fuel passage 208 may have a constant diameter, or it may have a diameter that changes along its longitudinal length between a first end 236 and a second end 238 that may be at the nozzle body outlet 228. In the example shown in FIG. 16, the fuel passage 208 has a first section 240 extending from the second end 220 of the nozzle body 204 to a second section 242 that leads to a third section 244 that extends to the first end 212 of the nozzle body 204, and the first and third sections 240, 244 are larger in flow area (e.g. cross-sectional area) than the second section 242. The smaller area second section 242 may increase the velocity of fuel, and the flow of fuel into the larger third section 244 may cause a decrease in pressure that may help to entrain air into the fuel flow, and promote mixing of fuel and air upstream of the nozzle body outlet 228. Of course, fewer or more than three sections may be provided and the fuel passage 208 may have any desired flow area(s) along its length.

To further encourage or improve mixing of fuel and air, the fuel chamber 210 is of a relatively small size and has a height, measured from the first end 212 of the nozzle body 204 to the bottom surface 214 of the cavity 206 in which the fuel outlets 112 are formed, that is equal to or less than the diameter of the nozzle body outlet 228. A flow area of the nozzle body outlet 228 (i.e. the cross-sectional area at the outlet) is between 15% and 45% of the volume of the fuel chamber 210. Thus, the area in which the fuel and air mixture is received after exiting the nozzle body outlet 228 is small and, in at least some implementations, the velocity of the fuel and air mixture at the nozzle body outlet 228 is maintained or even increased as it flows into and through the fuel chamber 210.

While the fuel chamber 210 is shown as being defined between the nozzle body 204 and throttle body 202, the nozzle body 204 may instead define the fuel chamber internally. And the fuel outlets 112 may likewise be defined in or by the nozzle body 204, if desired, such as by ports drilled into the first end 212 of the nozzle body 204 and intersecting the fuel chamber 210. Also if desired, the fuel chamber 210 may be defined by part of the feed passage 224, or at an end of the feed passage. In this way, separate fuel outlets 112 in the throttle body 202 might not be needed and the fuel may flow from the nozzle body 204 directly into the throttle bore 20 (e.g. the bottom of the cavity may be open or have openings aligned with the fuel outlets in the nozzle body, which may have the same size, shape and placement as the fuel outlets 112 shown in the throttle body 202). The timing and duration of the metering valve opening and closing may be controlled by a suitable microprocessor or other controller. The fuel flow (e.g. injection) timing, or when the metering valve 28 is opened during an engine cycle, can vary the pressure signal at the outlet 54 and hence the differential pressure across the metering valve 28 and the resulting fuel flow rate into the throttle bore 20. Further, both the magnitude of the engine pressure signal and the airflow rate through the throttle valve 36 change significantly between when the engine is operating at idle and when the engine is operating at wide open throttle. In conjunction, the duration that the metering valve 28 is opened for any given fuel flow rate will affect the quantity of fuel that flows into the throttle bore 20.

In general, the engine pressure signal within the throttle bore 20 at the fuel outlet 54 is of higher magnitude at engine idle than at wide open throttle. On the other hand, the pressure signal at the fuel outlet 54 generated by the air flow through the throttle bore 20 is of higher magnitude at wide open throttle than at idle.

Figure 9:
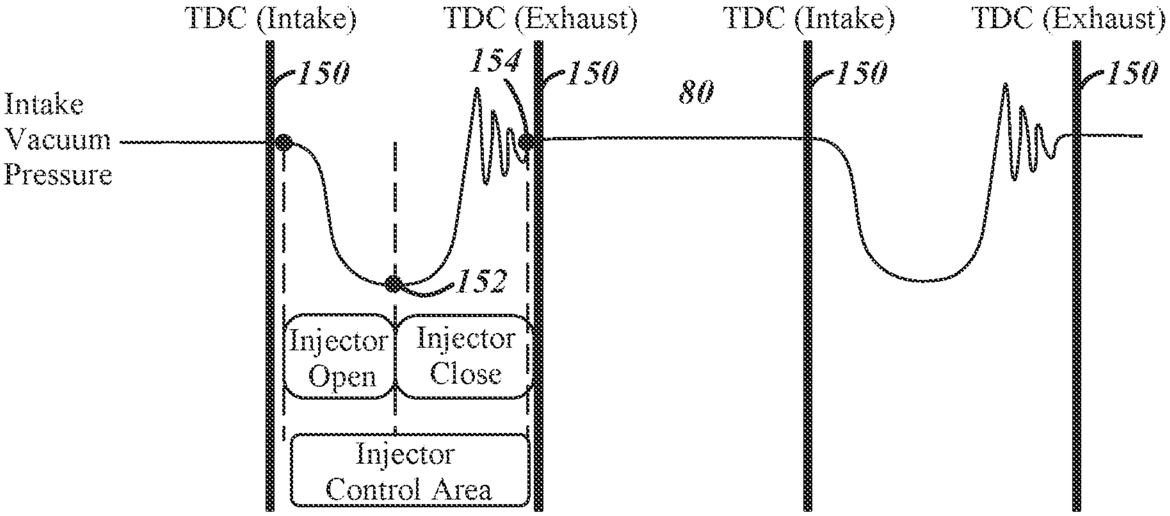
FIG. 9 is a graph of an intake pressure signal and illustrating a control window for actuation of the metering valve.

FIG. 9 illustrates a representative pressure signal that may be communicated with the throttle bore, such as the pressure at the engine intake manifold. In the example shown, when the engine piston is at a Top Dead Center (TDC) position (denoted by the vertical lines 150) and begins descending toward a bottom position, a negative or subatmospheric pressure is created in the combustion chamber and the intake manifold. That subatmospheric pressure is communicated with the fuel outlets 112 via the throttle bore 20, and also draws air through the throttle bore. The air flow through the throttle bore 20, and particularly the reduced flow area throat 32, creates a pressure drop across the fuel outlets 112 that also draws fuel from the fuel chamber 80 through the fuel outlets.

In at least some implementations, wherein the fuel flow in the throttle body assembly 10 is at very low pressure, and may occur without a positive pressure fuel pump, the fuel flow rate to the throttle bore 20 can be lower than for higher pressure fuel systems. Accordingly, to take advantage of the full pressure signal from the intake manifold, in at least some implementations, the metering valve 28 is opened just as the intake manifold pressure begins to decrease during an intake stroke of the engine (e.g. at or just after TDC). Further, the metering valve may be maintained in its open position until the subatmospheric pressure reaches its maximum value, generally indicated at point 152. At some time after that point 152, the metering valve 28 may be closed, depending upon the fuel requirements of the engine at that time (e.g. fuel requirements change as engine speed and loads change). When comparatively more fuel is needed, the metering valve 28 is maintained open longer and when comparatively less fuel is needed, the metering valve is closed sooner. When the intake pressure is at or nearly at its nominal value, shown at 154, the metering valve 28 should be closed to prevent any positive pressure from negatively affecting fuel flow through the metering valve. This may be at or just before when the piston reaches TDC again, and before the piston begins its subsequent descent during an exhaust stroke of the engine (in a two-stroke engine). Hence, the metering valve 28 can be controlled during the full pressure signal available during the intake stroke of the engine. As shown in FIG. 9, the pressure signal may vary as the piston nears TDC approaching the exhaust stroke, and as the fuel mixture is compressed within the combustion chamber, but the metering valve may remain open during that time if fuel flow is needed.

Figure 10:
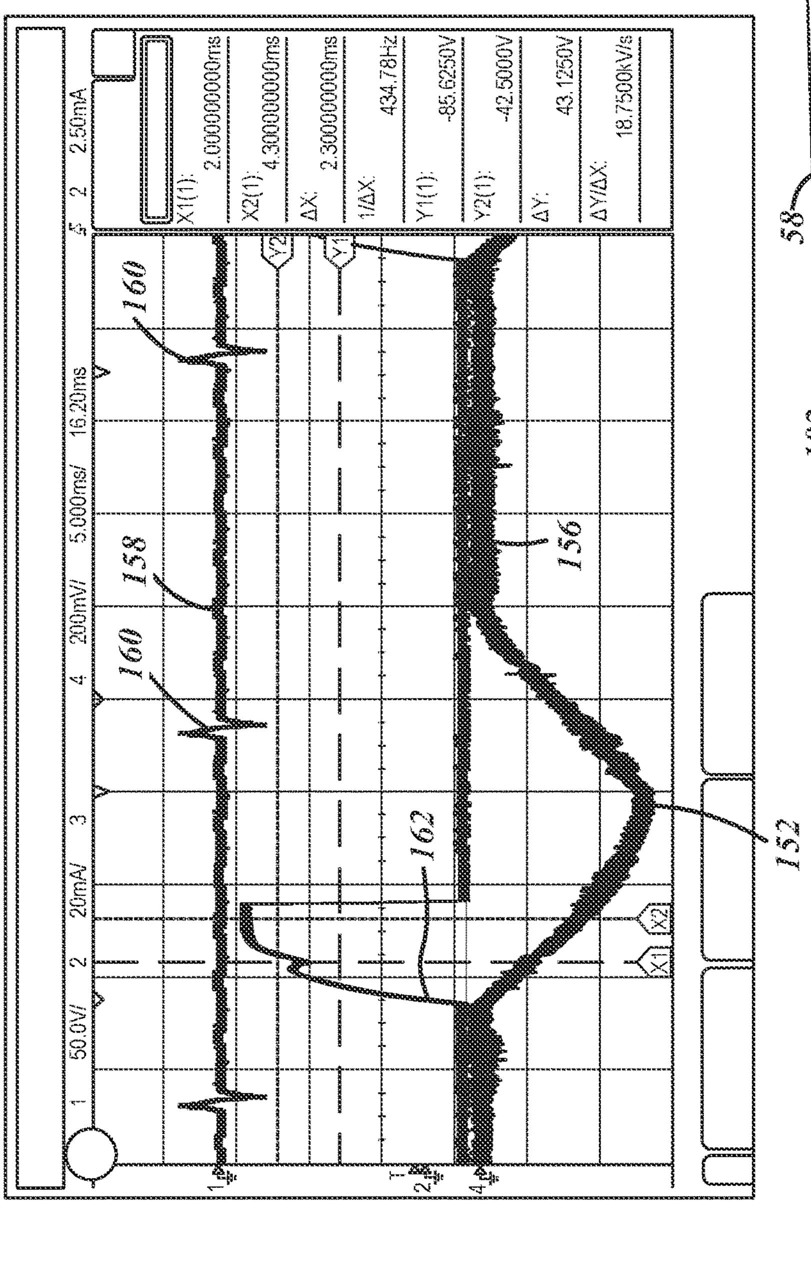
FIG. 10 is a graph showing the intake pressure signal and a current to the metering valve.

FIG. 10 illustrates one example wherein the intake pressure signal is shown by line 156, the engine position is shown by line 158 (where the spikes 160 indicate passing of a magnet associated with a flywheel or other component that rotates with the engine) and the metering valve state is shown by line 162 which shows the current provided to actuate the metering valve 28. In this example, current was provided to the metering valve 28 after the engine position signal (e.g. magnet passing) was detected and soon after the intake pressure began to decrease. The current to the metering valve 28 was terminated to permit the valve to close thereafter. Here, the metering valve 28 was closed prior to the intake signal 156 reaching its maximum value, which would provide a relatively low amount of fuel to the throttle bore 20, such as may be needed to support low speed and low load operation of the engine. For higher engine speeds or loads, the metering valve current would be provided for a longer duration to take advantage of more of the intake pressure pulse and cause more fuel to flow into the throttle bore.

The relative engine operating condition, for example, the engine position relative to TDC and whether the engine is in the intake or exhaust stroke, can be determined in different ways, including by an engine speed sensor. The speed sensor may be a VR sensor that is responsive to the passing by the sensor of a magnet on the engine flywheel, or otherwise, as is known in the art. The engine fuel demand can be determined, in at least some implementations, as a function of the speed sensor and/or a throttle valve position sensor.

In the example shown in FIGS. 2-4, the throttle valve position sensor 164 is provided so that the system may determine the instantaneous rotary position of the throttle valve 36. The throttle valve position sensor 164 may include a magnet 166 carried by the throttle valve shaft 40 (e.g. by a carrier 167 fixed to the shaft 40) and a magnetically responsive sensor 168 carried by a circuit board 170. The circuit board 170, sensor 168 and an end of the throttle valve shaft 40 on which the magnet 166 is received in and may be covered by a housing 172 coupled to the throttle body 18. The throttle position sensor 164 may be of any suitable type, and while shown as a non-contact, magnetic sensor, it could be a contact based sensor (e.g. variable resistance or potentiometer). The circuit board 170 may include a controller or processor 174 used to determine throttle valve position (e.g. idle, fully or wide open or any position or degree of opening between idle and wide open), or it may communicate the output of the sensor 168 with a remotely located controller. Further, where the circuit board 170 includes a controller 174, the same controller may also be used to control actuation of the metering valve 28.

In the example shown, the throttle position sensor 164 is at one end of the throttle valve shaft 40 and the throttle valve actuator 44 (e.g. the motor 46 or valve lever) is at the other end. In such an arrangement, both ends of the throttle valve 36 may be accessible from the exterior of the throttle body 18, and may have components mounted thereto such that a retainer for the throttle valve shaft 40 is positioned between the ends of the shaft. In the implementations shown in FIGS. 3 and 4, the retainer includes a c-clip 176 or an e-clip partially inserted into a groove 178 formed in the periphery of the throttle valve shaft 40. The retainer 176 inhibits or prevents axial movement of the shaft 40 in one direction, and another retainer, or the carrier 167 on the opposite side of the throttle bore 20 may inhibit or prevent axial movement of the shaft 40 in the opposite direction. Other arrangements of a throttle valve 36 may be used, including an arrangement wherein both the position sensor 164 and actuator 44 are at the same end of the throttle valve shaft 40.

In at least some implementations, a stepper motor 46 may be used to actuate the throttle valve 36 and the rotary position of the stepper motor may be used to determine the throttle valve 36 position, if desired. For example, a controller 174 used to actuate the stepper motor 46 may track the rotary position of the stepper motor and that may be used to determine the throttle valve 36 position. With a stepper motor 46 actuating the throttle valve 36, it may still be desirable to include a separate throttle position sensor 164 to provide feedback for use in actuating the throttle valve 36 for improved throttle valve control and position determination.

Figure 11:
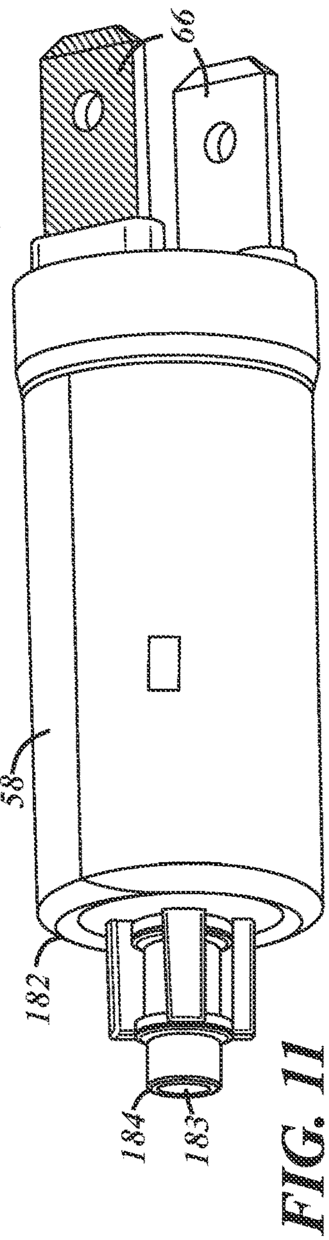
FIG. 11 is a perspective view of a solenoid type metering valve that may be used with the throttle body assembly.
Figure 12:
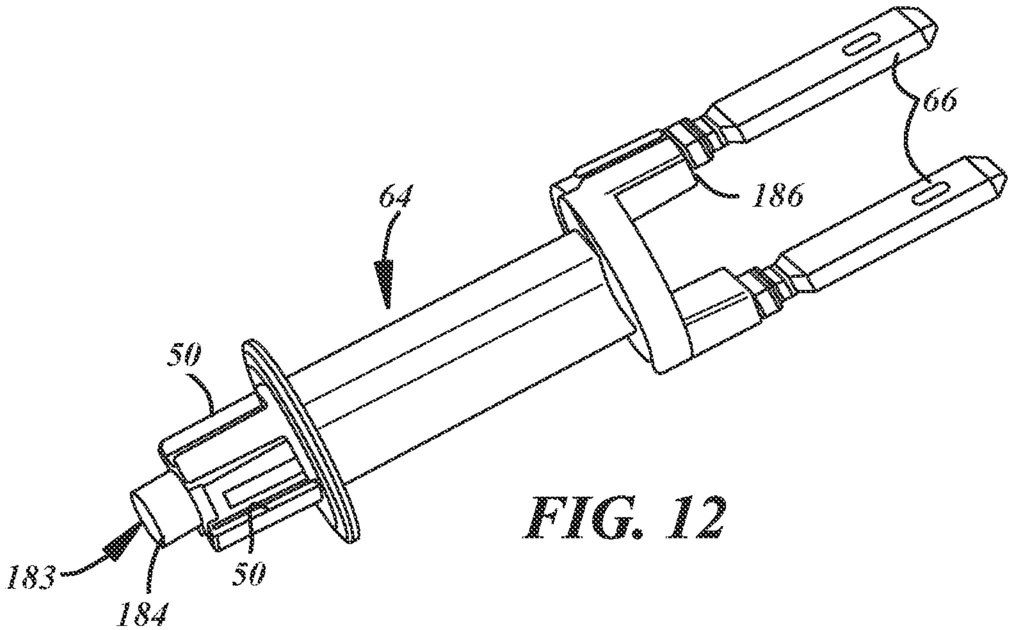
FIG. 12 is a perspective view of a bobbin of the valve shown in FIG. 11.
Figure 13:
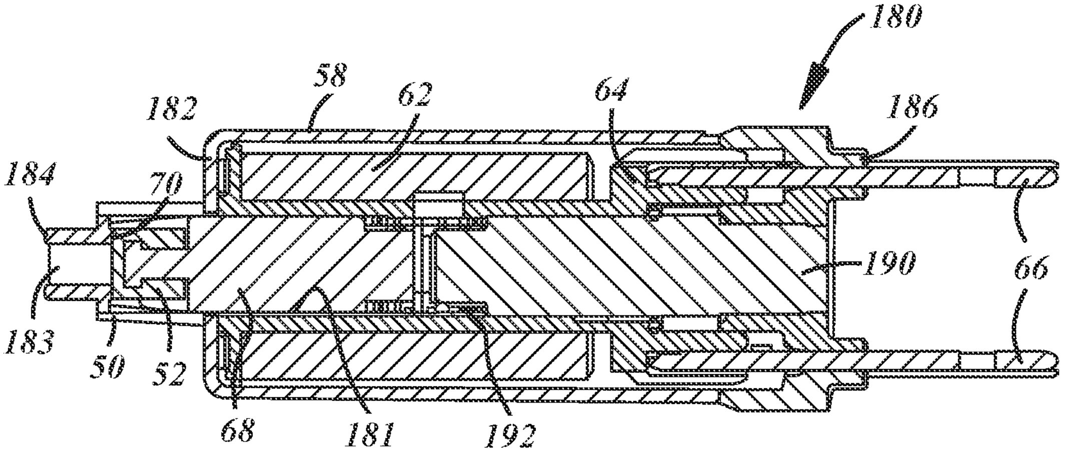
FIG. 13 is a sectional view of the valve shown in FIG. 11.

A metering valve 180 that may be used with the throttle body 18 is shown in FIGS. 11-13. As best shown in FIG. 13, the metering valve 180 may have an outer casing or housing 58 that surrounds the coil 62, the bobbin 64 on which the coil 62 is received and the armature 68 that is moved relative to the bobbin 64 in a passage 181 in the bobbin by the magnetic field created by the coil 62 when energized. In the example shown, the bobbin 64 extends axially outwardly from an end 182 of the housing 58 and defines a valve seat 70 engagable by the armature 68 or a valve driven by or valve head 52 carried by the armature. The valve seat 70 is upstream of an outlet port 183 at an end 184 of the bobbin 64. At its other end 186, the bobbin 64 may carry electrical terminals 66 (which may be male spade terminals as shown in the drawings) to which the coil 62 is coupled in a known manner. An armature stop 190 may be received within the bobbin passage 181 and located to limit movement of the armature 68 away from the valve seat 70. A biasing member, such as a coil spring 192, may be received between the armature 68 and armature stop 190 to yieldably bias the armature toward the valve seat 70 so that the metering valve 28 is closed when power is not supplied to the coil 62.

The bobbin 64 also defines a fuel inlet 50 for the metering valve 28 which is defined by one or more openings in the portion of the bobbin 64 that extends outwardly from the housing 58. The openings 50 may extend radially through the bobbin 64 and fuel thus flows from outside of the bobbin 64 and through the openings 50 to the passage 181 inside of the bobbin in which the armature 68 and/or valve move. When the armature 68 and/or valve are in an open position, fuel may flow through the valve seat 70 and out of the outlet port 182. When the armature 68 and/or valve are in a closed position, fuel is inhibited or prevented from flowing through the valve seat 70. As noted above with regard to FIGS. 2 and 8, the inlet(s) 50 in the bobbin 64 may extend from a location at or within 2 mm of the adjacent end of the coil 62. In the implementation shown, the housing 58 covers the coil 62 and includes a radially inwardly extending end 182 providing an edge or rim that is adjacent to the inlet(s) 50 and engageable by at least some fuel flowing from the inlet fuel chamber 80 to the inlet(s) 50. That is, a fluid seal is not provided between the inlet fuel chamber 80 and the end 182 of the housing 58. Some of the heat generated by the coil 62 is transmitted to the housing 58, and from the housing to the fuel. This may cool the housing 58 and metering valve 28 generally, and any vapor generated in the fuel as a result may be vented from the fuel chamber 80 as noted above. Further, the inlet(s) 50 may be mounted directly beneath the outlet of the inlet fuel chamber 80, where beneath in this instance means below and in-line with the direction of the force of gravity. The one or more inlets 50 may be of an axial length (dimension in the direction of the axis of the metering valve) of between 0.1 mm and 6 mm.

Figure 14:
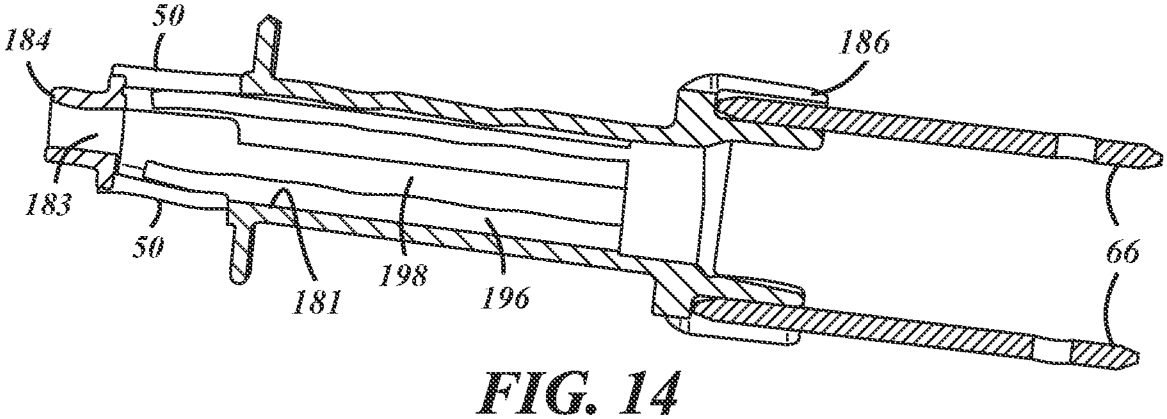
FIG. 14 is a sectional view of a bobbin including one or more voids formed in an inner surface of the bobbin.

As shown in FIG. 14, to reduce the surface area of the bobbin 64 that is engageable by the armature 68, voids 196 may be provided within the inner surface 198 of the bobbin, at least within the area of the passage 181 in which the armature 68 is received. In the example shown in FIG. 14, one or more axially extending slots 196 are formed in the inner surface 198 of the bobbin 64. The slots 196 may extend along all or a portion of the axial length of the bobbin passage 181. The slots 196 may have any desired radial depth and may be circumferentially spaced apart to provide reduced surface area contact portions in between the slots 196. The armature 68 may engage one or more contact portions (areas of inner surface 198 between the slots) for guided movement between the open and closed positions of the metering valve 28. The reduced surface area of potential engagement between the armature 68 and bobbin 64 can reduce friction between them and increase the rate of movement of the armature to improve the response time of the metering valve.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A charge forming device for a combustion engine, comprising:

a throttle body having a throttle bore with an inlet through which air flows into the throttle bore, an outlet from which a fuel and air mixture exits the throttle bore, and an air passage having at least a portion in which air flows separate from the throttle bore;

a throttle valve having a valve head received within the throttle bore and movable relative to the throttle body between a first position and a second position wherein the flow area between the valve head and the throttle body is greater when the valve head is in the second position than in the first position;

a fuel metering valve having a valve element and a fuel outlet, the valve element is movable relative to a valve seat to control fuel flow through the fuel outlet; and a nozzle body having a fuel passage and a feed passage, the fuel passage is arranged to receive fuel that exits the fuel outlet, and the fuel passage is communicated with a fuel chamber through which fluid flows into the throttle bore, and the feed passage is communicated with the air passage to receive air from the air passage and the feed passage is communicated with the fuel passage upstream of the fuel chamber, wherein air in the feed passage is mixed with fuel in the fuel passage upstream of the fuel chamber.

2. The device of claim 1, wherein the nozzle body is at least partially received within a cavity in the throttle body, and the fuel chamber is defined between an end of the nozzle body and a surface of the throttle body that defines part of the cavity.

3. The device of claim 2, wherein the nozzle body includes a nozzle body outlet through which a mixture of fuel and air flows into the fuel chamber, and wherein a distance between the end of the nozzle body and the surface that defines the cavity is equal to or less than a diameter of the nozzle body outlet.

4. The device of claim 2, wherein the nozzle body includes a nozzle body outlet through which a mixture of fuel and air flows into the fuel chamber, and wherein a flow area of the nozzle body outlet is between 15% and 45% of the volume of the fuel chamber.

5. The device of claim 2, wherein the surface of the throttle body that defines part of the cavity is part of a wall, and wherein the wall includes fuel outlets through which fuel flows into the throttle bore.

6. The device of claim 1, wherein one or both of the air passage and the feed passage includes a reduced diameter portion that is upstream of where the feed passage is communicated with the fuel passage.

7. The device of claim 6, further comprising a jet provided in the air passage or in the feed passage, the jet defining a minimum air flow area of both the air passage and the feed passage.

8. The device of claim 1, wherein the feed passage intersects the fuel passage within the nozzle body.

9. The device of claim 8, wherein the feed passage includes an inlet that has a flow area that is larger than a portion of the feed passage downstream from the inlet to increase air velocity from the inlet to said portion of the feed passage downstream from the inlet.

10. The device of claim 1, wherein the fuel passage includes a first portion and a second portion, the first portion has a smaller flow area than the second portion to change the velocity and pressure of fuel flowing through the fuel passage.

11. The device of claim 10, wherein the feed passage intersects the fuel passage within the second portion, and wherein the first portion is upstream of the second portion relative to the direction of fuel flow through the fuel passage.

12. A charge forming device for a combustion engine, comprising:

a throttle body having a throttle bore with an inlet through which air flows into the throttle bore, an outlet from which a fuel and air mixture exits the throttle bore, and an air passage having at least a portion in which air flows separate from the throttle bore;

a throttle valve having a valve head movable relative to the throttle body between a first position and a second position wherein the flow area between the valve head and the throttle body is greater when the valve head is in the second position than in the first position; and a nozzle body having a fuel passage and a feed passage, the fuel passage is arranged to receive fuel prior to that fuel entering the throttle bore, and the nozzle body includes a nozzle body outlet that is communicated with a fuel chamber defined between the nozzle body and the throttle body and through which fluid flows into the throttle bore, and the feed passage is communicated with the air passage to receive air from the air passage and the feed passage is communicated with the fuel passage upstream of the fuel chamber, wherein air in the feed passage is mixed with fuel in the fuel passage upstream of the fuel chamber.

13. The device of claim 12, wherein the nozzle body is received within a cavity in the throttle body, and the fuel chamber is defined between an end of the nozzle body and a surface that defines part of the cavity.

14. The device of claim 13, wherein a distance between the end of the nozzle body and the surface that defines the cavity is equal to or less than a diameter of the nozzle body outlet.

15. The device of claim 13, wherein a flow area of the nozzle body outlet is between 15% and 45% of the volume of the fuel chamber.

16. The device of claim 13, wherein the feed passage intersects the fuel passage within the nozzle body.

17. The device of claim 16, wherein the feed passage has a first portion with a smaller flow area than a second portion upstream of the first portion with respect to the direction of air flow through the feed passage, and the first portion is upstream of the intersection with the fuel passage.

18. The device of claim 16, wherein the fuel passage includes a first portion with a larger flow area than a second portion of the fuel passage, the first portion is downstream of the second portion with respect to the direction of fuel flow in the fuel passage, and the feed passage intersects the fuel passage in said first portion of the fuel passage.

19. The device of claim 12, wherein one or both of the air passage and the feed passage includes a reduced diameter portion that is upstream of where the feed passage is communicated with the fuel passage.

20. The device of claim 19, further comprising a jet provided in the air passage or in the feed passage, the jet defining a minimum air flow area of both the air passage and the feed passage.

* * * * *